United States Patent
Brant et al.

(10) Patent No.: US 9,502,705 B2
(45) Date of Patent: Nov. 22, 2016

(54) MICROPOROUS FILM, METHODS FOR MAKING SUCH FILM, AND USE FOR SUCH FILM AS BATTERY SEPARATOR FILM

(75) Inventors: Patrick Brant, Seabrook, TX (US); Takeshi Ishihara, Nasushiobara (JP); Satoshi Miyaoka, Nasushiobara (JP); Donna J. Crowther, Seabrook, TX (US); Koichi Kono, Nasushiobara (JP)

(73) Assignee: Toray Battery Separator Film Co., Ltd. (JP)

(*) Notice: Subject to any disclaimer, the term of this patent is extended or adjusted under 35 U.S.C. 154(b) by 532 days.

(21) Appl. No.: 13/996,028

(22) PCT Filed: Dec. 20, 2011

(86) PCT No.: PCT/JP2011/079470
§ 371 (c)(1),
(2), (4) Date: Jun. 20, 2013

(87) PCT Pub. No.: WO2012/086629
PCT Pub. Date: Jun. 28, 2012

(65) Prior Publication Data
US 2013/0288102 A1  Oct. 31, 2013

Related U.S. Application Data

(60) Provisional application No. 61/426,042, filed on Dec. 22, 2010.

(51) Int. Cl.
*H01M 2/16* (2006.01)
*C08J 5/18* (2006.01)
*B29C 55/00* (2006.01)
(Continued)

(52) U.S. Cl.
CPC ............. *H01M 2/16* (2013.01); *B29C 55/005* (2013.01); *B32B 27/06* (2013.01); *B32B 27/32* (2013.01); *C08J 5/18* (2013.01); *H01M 2/1653* (2013.01); *B29K 2023/10* (2013.01); *B29K 2105/041* (2013.01); *B32B 2307/5825* (2013.01);
(Continued)

(58) Field of Classification Search
USPC ................... 429/145; 428/315.9; 210/500.36
See application file for complete search history.

(56) References Cited

U.S. PATENT DOCUMENTS 5,084,534 A * 1/1992 Welborn, Jr. ........... C08F 10/00
526/160
2007/0264483 A1* 11/2007 Ozaki ................ B01D 67/0025
428/304.4
(Continued)

FOREIGN PATENT DOCUMENTS

JP  60-242035  12/1985
JP  03-064334  * 3/1991
(Continued)

OTHER PUBLICATIONS

Thomas Sun et al., "Effect of Short Chain Branching on the Coil Dimensions of Polyolefins in Dilute Solution," Macromolecules, 2001, vol. 34, No. 19, pp. 6812-6820 (Abstract only).

*Primary Examiner* — Peter D Mulcahy
*Assistant Examiner* — Henry Hu
(74) *Attorney, Agent, or Firm* — DLA Piper LLP (US)

(57) ABSTRACT

A microporous membrane includes a low melting polypropylene, the low melting polypropylene being a polypropylene homopolymer or copolymer having an MFR≥2.0×10², a Tm of 85.0° C. to 130.0° C., and a Te-Tm≤10° C.

8 Claims, 1 Drawing Sheet

(51) Int. Cl.
  *B32B 27/06* (2006.01)
  *B32B 27/32* (2006.01)
  *B29K 23/00* (2006.01)
  *B29K 105/04* (2006.01)

(52) U.S. Cl.
  CPC ...... *B32B2307/724* (2013.01); *B32B 2457/10* (2013.01); *C08J 2323/10* (2013.01)

(56) References Cited

U.S. PATENT DOCUMENTS

2009/0186279 A1 * 7/2009 Brant .................. C08F 10/00
  429/249
2010/0297491 A1 * 11/2010 Ishihara ............... B01D 69/125
  429/145

FOREIGN PATENT DOCUMENTS

| | | | |
|---|---|---|---|
| JP | 03-201360 | | 9/1991 |
| JP | 05-025305 | | 2/1993 |
| JP | 60-023954 | | 2/1995 |
| JP | 11-195409 | * | 7/1999 |
| JP | 11-269289 | | 10/1999 |
| JP | 2002-128943 | | 5/2002 |
| JP | 2002-322310 | | 11/2002 |
| JP | 2002-338730 | * | 11/2002 |
| JP | 2004-307712 | | 11/2004 |
| JP | 2008-214426 | * | 9/2008 |
| WO | 97/23554 | | 7/1997 |
| WO | 2007/052663 A1 | | 5/2007 |
| WO | WO-2007/052663 A1 | * | 5/2007 |
| WO | 2007/132942 A1 | | 11/2007 |
| WO | WO-2007/132942 A1 | * | 11/2007 |
| WO | 2008/016174 A1 | | 2/2008 |

* cited by examiner

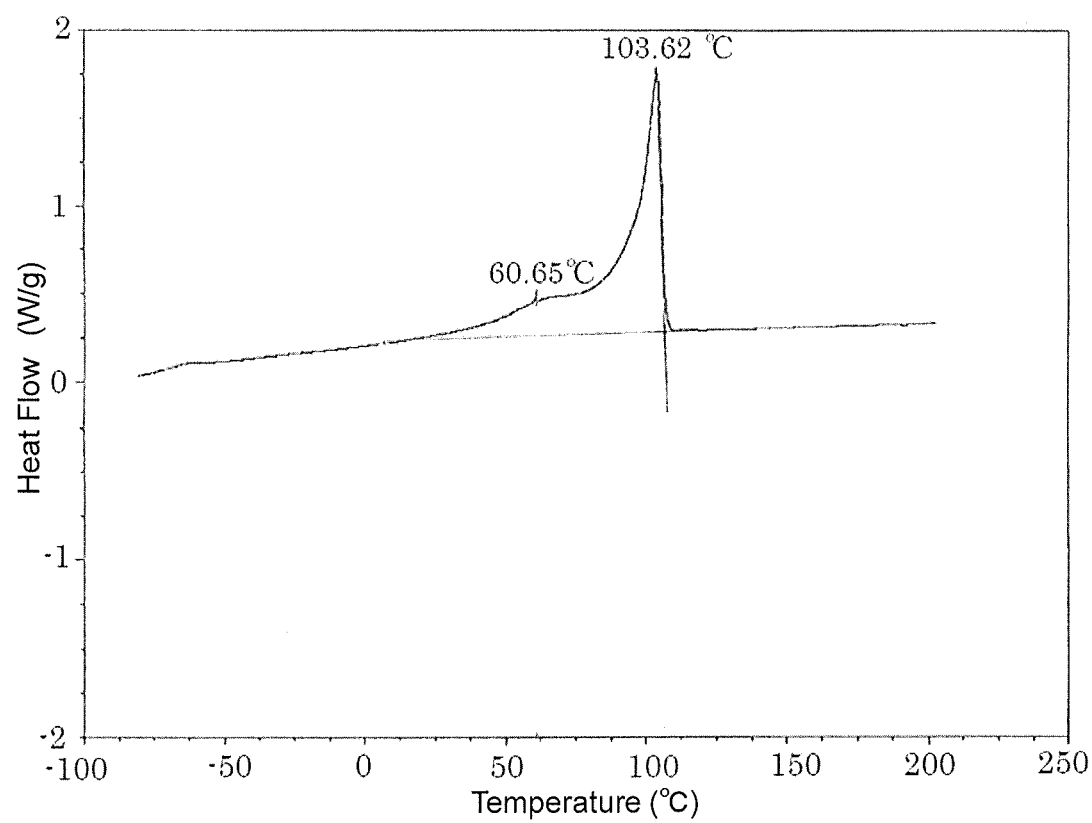

MICROPOROUS FILM, METHODS FOR MAKING SUCH FILM, AND USE FOR SUCH FILM AS BATTERY SEPARATOR FILM

TECHNICAL FIELD

The present invention relates to microporous membranes comprising polymer and having well-balanced permeability, shutdown temperature, and pin puncture strength. The invention also relates to methods for making such membranes, and the use of such membranes as battery separator film in, e.g., lithium ion secondary batteries.

BACKGROUND ART

Microporous membranes are useful as separators for primary and secondary batteries. Such batteries include lithium ion secondary batteries, lithium-polymer secondary batteries, nickel-hydrogen batteries, nickel-cadmium batteries, nickel-zinc batteries, silver-zinc batteries, etc. When a microporous polyolefin membrane is used as a separator for a lithium ion battery, the membrane's properties significantly affect the battery's performance. In particular, the microporous polyolefin membrane's permeability and shutdown temperature generally affect the battery's performance.

It is desirable for a battery separator film to have a relatively low shutdown temperature compared to its meltdown temperature in order to improve battery safety margin. In general, microporous polyolefin membranes containing polyethylene have a relatively high shutdown temperature of about 132° C. to 140° C.

Microporous membranes having high strength and high permeability have been made using an ultra-high-molecular-weight polyolefin (hereinafter called "UHMWPO"). For example, JP60-242035A discloses a UHMWPO membrane made by a process comprising molding step of a gel-like sheet made by extruding a solution containing a UHMWPO having an average molecular weight $\geq 7 \times 10^5$ and a solvent, removing step of the solvent from the gel-like sheet, and then stretching step of the gel-like sheet. JP03-064334A discloses a polyolefin microporous membrane having a specific molecular weight distribution in order to produce the microporous membrane from a high-concentration UHMWPO solution.

Japanese patent applications JP60-023954A, JP03-201360A, and JP05-025305A disclose battery separator film comprising branched low density polyethylene (LDPE) and/or linear low density polyethylene (LLDPE). The film is said to have a relatively low shutdown temperature. Further, Japanese patent application JP11-269289A discloses a microporous membrane comprising 2 to 80 wt % of a substantially linear ethylene-alpha-olefin copolymer having a melting peak of 95° C. to 125° C. in order to reduce shutdown temperature. Though shutdown temperature is improved, the use of relatively low melting peak polyethylene can result in lower air permeability, particularly when film production, battery production, or battery use involves temperatures $\geq$ the polyethylene's melting peak. Japanese patent application JP2002-338730A discloses that this loss of permeability can be partially overcome by using a polyethylene having a relatively higher melting peak, e.g., in the range of 125° C. to 132° C.

PRIOR ART DOCUMENTS

Patent Documents

Patent Document 1: JP S60-242035A
Patent Document 2: JP H03-064334A
Patent Document 3: JP S60-023954A
Patent Document 4: JP H03-201360A
Patent Document 5: JP H05-025305A
Patent Document 6: JP H11-269289A
Patent Document 7: JP 2002-338730A

SUMMARY OF THE INVENTION

Problems to be Solved by the Invention

As described the above, while improvements have been made, membranes having relatively low shutdown temperature and relatively high air permeability are desired.

Means for Solving the Problems

A microporous membrane comprising a low melting polypropylene, the low melting polypropylene being a polypropylene homopolymer or copolymer having a melt flow rate ("MFR")$\geq 2.0 \times 10^2$, a Tm in the range of 85.0° C. to 130.0° C., and a Te-Tm$\leq 10°$ C. Some membranes may have a normalized air permeability $\leq 7.5 \times 10^2$ seconds/100 cm$^3$/20 µm and a shutdown temperature $\leq 130.5°$ C.

In particular embodiments, the low melting polypropylene is (i) polypropylene homopolymer having a number average molecular weight ("Mn") in the range of $1.0 \times 10^4$ to $5.0 \times 10^4$, a molecular weight distribution ("MWD", defined as Mw/Mn, where Mn is the number average molecular weight) in the range of 1.5 to 5.0 and/or (ii) a copolymer of propylene and 10.0 mol. % of one or more α-olefin comonomers, the copolymer having a Mn in the range of $1.0 \times 10^4$ to $5.0 \times 10^4$, a MWD in the range of 1.8 to 3.5, a Tm in the range of 100.0° C. to 126.0° C., and a Te-Tm in the range of 2.0° C. to 4.0° C. Some such membranes further optionally comprise one or more of a first polyethylene having a Tm$\geq 131.0°$ C. and an Mn in the range of $1.0 \times 10^5$ to $9.0 \times 10^5$, and a second polyethylene having an Mn$>1.0 \times 10^6$.

In another aspect, the invention provides multilayer microporous membranes, wherein at least one layer thereof comprising a low melting polypropylene, the low melting polypropylene being a polypropylene homopolymer or copolymer having an MFR$\geq 2.0 \times 10^2$, a Tm in the range of 85.0° C. to 130.0° C., and a Te-Tm$\leq 10°$ C.

In yet another aspect, embodiments of the invention provide a battery separator film comprising at least one layer thereof comprising a low melting polypropylene, the low melting polypropylene being a polypropylene homopolymer or copolymer having an MFR$\geq 2.0 \times 10^2$, a Tm in the range of 85.0° C. to 130.0° C., and a Te-Tm$\leq 10°$ C.

In still another aspect, embodiments of the invention include a process for producing a microporous membrane, comprising: (1) extruding a mixture including at least a diluent and a low melting polypropylene, wherein the low melting is polypropylene homopolymer or propylene copolymer having an MFR$\geq 2.0 \times 10^2$, a Tm in the range of 85.0° C. to 130.0° C., and a Te-Tm$\leq 10°$ C.; (2) stretching the extrudate in at least one planar direction; and (3) removing at least a portion of the diluent from the stretched extrudate to form the microporous membrane.

In still other embodiments, the invention relates to the use of a battery including such a separator as a power source in, e.g., an electric vehicle, hybrid electric vehicle, power tool, computer, mobile phone, consumer electronics, etc.

Effects of the Invention

According to the invention, the problems of the prior arts can be solved, that is, membranes having relatively low shutdown temperature and relatively high air permeability can be obtained. Such porous membranes have well-balanced air permeability, shutdown temperature and pin puncture strength.

BRIEF DESCRIPTION OF THE DRAWINGS

FIG. 1 illustrates an exemplary plot of DSC data (second melt) used to determine Tm and Te from a polymer sample wherein heat supplied to the sample ("heat flow"; Y axis in Watts/gram) is plotted against sample temperature ("Temperature"; X axis in ° C.).

BEST MODE FOR CARRYING OUT THE INVENTION

The invention relates to a microporous membrane comprising polypropylene having a relatively low melting peak ("Tm"), e.g., ≤130.0° C. thereby providing a means to lower the membrane shutdown temperature by incorporation of polypropylene.
Composition of Materials Used to Produce the Microporous Polyolefin Membrane In an embodiment the microporous membrane is made by extruding a mixture of polymer and diluent. The diluent can be a solvent for the polymer. Regardless of the solubility of the polymer, however, the mixture of polymer and diluent is generally referred to as a polymer solution. When the polymer is polyolefin and the diluent is liquid paraffin, the mixture can be called a polyolefin solution. When a polymer is a mixture of polymers, e.g., a combination of polyolefins, it can be called a polymeric composition, e.g., a polyolefin composition. The polymer can be a mixture of individual polymer components or a reactor blend, for example. In an embodiment, the membrane is produced from diluent and a mixture of polyolefins, where the diluent is a solvent for the polyolefin mixture, e.g. liquid paraffin. Examples of useful polyolefins will now be described in more detail. While the invention is described in terms of these embodiments, it is not limited thereto, and the description of these embodiments is not meant to foreclose other embodiments within the broader scope of the invention.
The Low-Melting Polypropylene The low melting polypropylene comprises a polypropylene homopolymer or copolymer characterized by an MFR≥2.0×10$^2$, a Tm in the range of 85.0° C. to 130.0° C., and a Te-Tm≤10° C.

The microporous membrane comprises an amount of the low melting polypropylene to provide a shutdown function. Typically the lower limit on the amount of polypropylene is believed about 5.0 wt %. The lower limit on the amount of low melting polypropylene may be 7.5, 10.0, 12.5, 15.0, 17.5, 20.0, 22.5, 25.0, or 27.5 wt %. The upper limit on the amount of low melting polypropylene is believed to be about 30.0 wt %. In some embodiments, the upper limit is 7.5, 10.0, 12.5, 15.0, 17.5, 20.0, 22.5, 25.0, or 27.5 wt %. Particularly useful amounts of low melting polypropylene are, for example, 5.0 to about 30.0 wt %, 7.5 to 27.5 wt %, 10.0 to 25.0 wt %, and 12.5 to 20.0, wt %. The amount of low melting polypropylene is based on the weight of the layer in which it is present unless otherwise specified.

In particular embodiments, low melting polypropylene has a Tm in the range of from 115.0° C. to 130.0° C., and a Mn in the range of from 5.0×10$^3$ to 4.0×10$^5$. In an embodiment, the first polyethylene has a Tm of from 120.0° C. to 128.0° C., such as 120.0° C. to 126.0° C., or 120.5° C. to 124.5° C., or 121.0° to 124.0° C. In another embodiment, the first polyethylene has Tm in the range of from 122.0° C. to 126.0° C. When the Tm is too low, it is more difficult to produce a thermally-stable membrane (one having low heat shrinkage, for example) without also reducing membrane permeability. Thermal treatment temperatures (e.g., heat setting temperatures)>115.0° C. are generally used to produce thermally-stable membranes, and membrane permeability decreases when the heat setting temperature is ≥the polymer's Tm. When the Tm of the low melting polypropylene is >131.0° C., it is more difficult to produce a microporous membrane having both high air permeability and low shutdown temperature.

In some embodiments, the low melting polypropylene has an Mn in the range of from 8.0×10$^3$ to 2.0×10$^5$. In an embodiment, the low melting polypropylene has an Mn in the range of from 1.0×10$^4$ to 1.0×10$^5$. In another embodiment, the low melting polypropylene has an Mn in the range of from 1.0×10$^4$ to 4.0×10$^4$, 1.0×10$^4$ to 3.5×10$^4$, 1.0×10$^4$ to 3.0×10$^4$, 1.0×10$^4$ to 2.5×10$^4$, or 1.0×10$^4$ to 2.0×10$^4$. In some embodiments, it has been observed that when the low melting polypropylene has a Mn significantly <5.0×10$^3$ or Mn is significantly >4.0×10$^5$, it is more difficult to produce a microporous membrane having good air permeability even when Tm is relatively high, e.g., in the range of 125° C. to 130° C., or greater. Optionally, the low melting polypropylene has a MWD≤100, for example, in the range of from 1.5 to 20, from about 1.5 to about 7.0, or from about 1.8 to about 6.0. In particular embodiments, the low melting polypropylene may have a MWD of 1.5 to 5.0, a ΔHm≥40.0 J/g; and/or a density in the range of from 0.850 g/cm$^3$ to 0.900 g/cm$^3$.

In an embodiment, the low melting polypropylene comprises a copolymer of ethylene and a comonomer such as α-olefin. The comonomer is generally present in a relatively small amount compared to the amount of ethylene. For example, the comonomer amount is generally ≤15% by mole based on 100% by mole of the copolymer, such as from 1.0% to 5.0% by mol. Thus, in some embodiments, the low melting polypropylene is a copolymer comprising propylene-derived units and ≤15.0 mol. % of units derived from ethylene and/or one or more $C_4$-$C_{12}$ α-olefins. The comonomer can be, for example, one or more of propylene, butene-1, pentene-1, hexene-1,4-methylpentene-1, octene-1, vinyl acetate, methyl methacrylate, styrene, or other monomers. In some embodiments, the low melting polypropylene includes from 3.0 mol. % to 15 mol. %, or 4.0 mol. % to 14 mol. %, e.g., from 5.0 mol. % to 13 mol. % such as from 6.0 mol. % to 10.0 mol. % polymer units derived from a $C_4$-$C_{12}$ α-olefin. In particular embodiments, such amounts of the $C_4$-$C_{12}$ α-olefin polymer units are derived from hexene and/or octene. The low melting polypropylene can be made by any suitable method. Methods disclosed in U.S. Pat. No. 5,084,534 (such as the methods disclosed therein in examples 27 and 41), which is incorporated by reference herein in its entirety, may be used or adapted as would be apparent to one of ordinary skill in the art to provide the described low melting polypropylenes.

In an embodiment, the low melting polypropylene is a copolymer of propylene and at least one of ethylene, octene, or hexene comonomer and has a Mn in the range of from 1.5×10$^4$ to 5.0×10$^4$, and a MWD in the range of from 1.8 to 3.5, a Tm in the range of 100.0° C. to 126.0° C., and a Te-Tm in the range of 2.0° C. to 4.0° C.

In one embodiment, the low melting polypropylene is (i) polypropylene homopolymer having an Mn in the range of 1.0×10$^4$ to 5.0×10$^4$, a MWD in the range of 1.5 to 5.0. In another embodiment, the low melting polypropylene is a copolymer of propylene and ≤10.0 mol. % of one or more α-olefin comonomers and has a Mn in the range of $1.0 \times 10^4$ to $5.0 \times 10^4$, a MWD in the range of 1.8 to 3.5, a Tm in the range of 100.0° C. to 126.0° C., and a Te-Tm in the range of 2.0° C. to 4.0° C.

Tm is measured in accordance with JIS K7122. Namely, a sample of the low melting polypropylene (0.5-mm-thick molding melt-pressed at 210° C.) is placed at ambient temperature in a sample holder of a differential scanning calorimeter (Pyris Diamond DSC available from Perkin Elmer, Inc.), heat-treated at 230° C. for 1 minute in a nitrogen atmosphere, cooled to 30° C. at 10° C./minute, kept at 30° C. for 1 minute, and heated to 230° C. at a speed of 10° C./minute.

The First Polyolefin

The first polyolefin, e.g. polyethylene, has a Tm≥131.0° C. (e.g., in the range of 131.0° C. to 135° C.) and a Mn≤$1.0 \times 10^6$, e.g., in the range of from $1.0 \times 10^5$ to $9.0 \times 10^5$, for example from about $4 \times 10^5$ to about $8 \times 10^5$. Tm is measured the same way as for the low melting polypropylene. Optionally, the first polyolefin has a MWD≤$1.0 \times 10^2$, e.g., up to about to 50.0, such as from about 3.0 to about 20.0. For example, the first polyolefin can be one or more of a high density polyethylene ("HPDE"), a medium density polyethylene, a branched low density polyethylene, or a linear low density polyethylene. Optionally, the first polyolefin is HDPE. Optionally, the first polyolefin is a polyethylene having terminal unsaturation. For example, the polyethylene can have an amount of terminal unsaturation ≥0.20 per 10,000 carbon atoms, e.g., ≥5.0 per 10,000 carbon atoms, such as ≥10.0 per 10,000 carbon atoms. The amount of terminal unsaturation can be measured in accordance with the procedures described in PCT Publication No. WO1997/23554, for example. In another embodiment, the second polyethylene has an amount of terminal unsaturation ≤0.20 per 10,000 carbon atoms. Optionally, the amount of first polyolefin is ≤99.0 wt %, e.g., in the range of from 25.0 wt % to 99.0 wt %, e.g., from 50.0 wt % to 95.0 wt %, or 60.0 wt % to 85.0 wt %, is based on the weight of the layer in which it is present.

In an embodiment, the first polyolefin is at least one of (i) an ethylene homopolymer or (ii) a copolymer of ethylene and a comonomer such as propylene, butene-1, hexene-1, etc. When used, the comonomer amount is ≤10.0% by mole based on 100% by mole of the copolymer. Such a polymer or copolymer can be produced by any convenient polymerization process, such as those using a Ziegler-Natta or a single-site catalyst. The comonomer can be α-olefin, for example, optionally, the comonomer is one or more of propylene, butene-1, pentene-1, hexene-1,4-methylpentene-1, octene-1, vinyl acetate, methyl methacrylate, styrene, or other monomer.

The Second Polyolefin

In an embodiment, the second polyolefin, e.g., polyethylene, has a Mn≥$1.0 \times 10^6$, e.g., in the range of $1.1 \times 10^6$ to about $5.0 \times 10^6$, for example from about $1.2 \times 10^6$ to about $3.0 \times 10^6$, such as about $2 \times 10^6$. Optionally, the second polyolefin has a MWD≤$1.0 \times 10^2$, e.g., from about 2.0 to about $1.0 \times 10^2$, such as from about 4 to about 20 or about 4.5 to about 10.0. For example, the second polyolefin can be an ultra-high molecular weight polyethylene ("UHMWPE"). Optionally, the amount of the second polyolefin is ≤99.0 wt %, e.g., in the range of from 0 wt % to 74.0 wt %, e.g., 1.0 wt % to 46.0 wt %, or 7.0 wt % to 32.0 wt %, is based on the weight of the layer in which it is present. If the content of the second polyolefin is ≥74.0 wt %, it is more difficult to produce a microporous membrane having improved shutdown and heat shrinkage properties. In an embodiment, the second polyolefin is at least one of (i) an ethylene homopolymer or (ii) a copolymer of ethylene and a comonomer such as propylene, butene-1, hexene-1, etc. When used, the comonomer amount is ≤10% by mole based on 100% by mole of the copolymer. The comonomer can be polyolefin, for example. Optionally, the comonomer is one or more of propylene, butene-1, pentene-1, hexene-1,4-methylpentene-1, octene-1, vinyl acetate, methyl methacrylate, styrene, or other comonomer. Such a polymer or copolymer can be produced using any convenient polymerization process such as those using a Ziegler-Natta or a single-site catalyst.

The Combined Low Melting Polypropylene, First Polyolefin, and Second Polyolefin

In an embodiment, the membrane is produced from diluent and a mixture of the low melting polypropylene, first polyolefin, and second polyolefin. When these components are used, the MWD of the polymer composition in the polymer-diluent mixture can be controlled by conventional methods, e.g., by regulating the relative amounts and MWDs of the resins in the mixture, or by regulating reactor blend process conditions. In an embodiment, the first polyolefin is a high-density polyethylene. Optionally, the amount of combined first and second polyolefin in the membrane is ≥70.0 wt %, e.g., in the range of 70.0 wt % to about 95.0 wt %, based on the weight of the membrane. The amount of low melting polypropylene can range from about 5.0 to about 30.0 wt % as described herein above.

The Mn of the polyolefin composition including the low melting polypropylene, first polyolefin, and second polyolefin is not critical, and can range, e.g., from about $1 \times 10^4$ to about $1 \times 10^7$, or from about $1 \times 10^5$ to about $5 \times 10^6$, or from about $2 \times 10^5$ to about $3 \times 10^6$.

Determining Tm, Te-Tm, MFR, Mn, MWD, and CDBI

Peak melting point ("Tm") in ° C. and melting peak endpoint ("Te") in ° C. are determined using differential scanning calorimetry ("DSC"), e.g., using a TA Instruments Model 2920 calorimeter as follows. Samples weighing approximately 7-10 mg are molded and sealed in aluminum sample pans for 48 hours at room temperature (21° C. to 25° C.) before the DSC measurement, DSC data is then recorded by exposing the sample to a first temperature of −50° C. (the "first cooling cycle") and then exposing the sample to an increasing temperature at a rate of 10° C./minute to a second temperature of 200° C. (the "first heating cycle"). The sample is maintained at 200° C. for 5 minutes and then exposed to a decreasing temperature at a rate of 10° C./minute to a third temperature of −50° C. (the "second cooling cycle"). The sample temperature is again increased at 10° C./minute to 200° C. (the "second heating cycle"). Tm and Te are obtained from the data of the second heating cycle. Tm is the temperature of the maximum heat flow to the sample in the temperature range of −50° C. to 200° C. Polyethylene may show secondary melting peaks adjacent to the principal peak, and/or the end-of-melt transition, but for purposes herein, such secondary melting peaks are considered together as a single melting point, with the highest of these peaks being considered the Tm. Te is the temperature at which the melting is effectively complete, as determined from the DSC data by the intersection of an initial tangent line and a final tangent line. The initial tangent line is a line drawn tangent to DSC data on the high temperature side of the Tm peak at a temperature corresponding to a heat flow of 0.5 times the maximum heat flow to the sample. The initial tangent line has a negative slope as the heat flow diminishes toward the baseline. The final tangent line is a line drawn tangent to the DSC data along the measured baseline between Tm and 200° C. A plot of DSC data for a representative polyethylene sample during the second heating cycle is shown in the FIGURE. The polyethylene Tm is 103.62° C., and a secondary melting peak at 60.85° C. The intersection of the initial and final tangent lines as shown in the FIGURE yields a Te of approximately 106.1° C.

Polyethylene Mn and MWD are determined using a High Temperature Size Exclusion Chromatograph, or "SEC", (GPC PL 220, Polymer Laboratories), equipped with a differential refractive index detector (DRI). Three PLgel Mixed-B columns (available from Polymer Laboratories) are used. The nominal flow rate is 0.5 cm$^3$/min., and the nominal injection volume is 300 μL. Transfer lines, columns, and the DRI detector are contained in an oven maintained at 145° C. The measurement is made in accordance with the procedure disclosed in "Macromolecules, Vol. 34, No. 19, pp. 6812-6820 (2001)".

The GPC solvent used is filtered Aldrich reagent grade 1, 2 4-Trichlorobenzene (TCB) containing approximately 1000 ppm of butylated hydroxy toluene (BHT). The TCB is degassed with an online degasser prior to introduction into the SEC. Polymer solutions are prepared by placing dry polymer in a glass container, adding the desired amount of the above TCB solvent, then heating the mixture at 160° C. with continuous agitation for about 2 hours. The concentration of polymer in the solution is 0.25 to 0.75 mg/ml. Sample solution is filtered off-line before injecting to GPC with 2 μm filter using a model SP260 Sample Prep Station (available from Polymer Laboratories).

The separation efficiency of the column set is calibrated with a calibration curve generated using a seventeen individual polystyrene standards ranging in Mp ("Mp" being defined as the peak in Mw) from about 580 to about 10,000,000. The polystyrene standards are obtained from Polymer Laboratories (Amherst, Mass.). A calibration curve (log Mp vs. retention volume) is generated by recording the retention volume at the peak in the DRI signal for each PS standard and fitting this data set to a 2nd-order polynomial. Samples are analyzed using IGOR Pro, available from Wave Metrics, Inc.

CDBI is defined as the percent by weight of polyethylene copolymer whose composition is within 50% by weight of the median comonomer composition in the polyethylene's composition distribution. The "composition distribution" can be measured according to the following procedure. About 30 g of the copolymer is cut into small cubes about 3 mm per side. These cubes are introduced into a thick walled glass bottle closed with screw cap along with 50 mg of Irganox 1076, an antioxidant commercially available from Ciba-Geigy Corporation. Then, 425 ml of hexane (a mixture of normal and iso isomers) is added to the contents of the bottle and the sealed bottle is maintained at about 23° C. for about 24 hours. At the end of this period, the solution is decanted and the residue is treated with additional hexane for an additional 24 hours. At the end of this period, the two hexane solutions are combined and evaporated to yield a residue of the copolymer soluble at 23° C. To the residue is added sufficient hexane to bring the volume to 425 mL and the bottle is maintained at about 31° C. for 24 hours in a covered circulating water bath. The soluble copolymer is decanted and the additional amount of hexane is added for another 24 hours at about 31° C. prior to decanting. In this manner, fractions of the copolymer component soluble at 40° C., 48° C., 55° C., and 62° C. are obtained at temperature increases of approximately 8° C. between stages. Increases in temperature to 95° C. can be accommodated if heptane instead of hexane is used as the solvent for all temperatures about 60° C. The soluble copolymer fractions are dried, weighed and analyzed for composition, as for example by weight percent ethylene content. Soluble fractions obtained from samples in the adjacent temperature ranges are the "adjacent fractions". A copolymer is said to have a "narrow compositional distribution" when at least 75 wt % of the copolymer is isolated in two adjacent fractions, each fraction having a composition difference of no greater than 20% of the copolymer's average wt % monomer content.

The Mw and Mn of the polypropylene are determined by the method disclosed in PCT Patent Publication No. WO2007/132942, which is incorporated by reference herein in its entirety.

The melt flow rate ("MFR') is determined according to American Society for Testing and Materials method (ASTM) D-1238 (Condition L: 230° C. and 2.16 kg).

Additional Polymer

In addition to the low melting polypropylene, the first polyolefin, and the second polyolefin, the polymer composition can optionally contain additional polymers such as one or more homopolymer or copolymer of, e.g., polypropylene, polybutene-1, polypentene-1, poly-4-methylpentene-1, polyhexene-1, polyoctene-1, polyvinyl acetate, polymethyl methacrylate, polystyrene, etc. Optionally, particular embodiments include a third polymer in the form of a polyolefin that has an Mn in the range of about $1 \times 10^4$ to about $4 \times 10^6$. When used, the amount of the third polymer is generally in the range of ≤20.0 wt %, based on the weight of the polymer used to produce the microporous membrane layer, such as in the range of 0.5 wt % to 10.0 wt %. The polyolefin composition can also contain a polyethylene wax, e.g., one having an Mn of about $1 \times 10^3$ to about $1 \times 10^4$. When used, the amount of polyethylene wax is generally <about 20.0% wt % of the combined weight of the first second and third polymers and the polyethylene wax used to produce the microporous membrane. In an embodiment, the amount of polyethylene wax is ≤10.0 wt %, such as in the range of 0.5 wt % to 10 wt %. When used, the amount of third polymer and/or polyethylene wax is not critical provided they are not used in an amount that would cause significant deterioration of the properties of the microporous polyolefin membrane. In an embodiment, the third polymer is polypropylene having an Mn≥$1.0 \times 10^6$ and a heat of fusion (second melt) ≥90 J/g. Suitable polypropylenes are described in PCT Patent Publication No. WO2007/132942, which is incorporated by reference herein in its entirety.

Production Method of Microporous Membrane

In an embodiment, the microporous membrane is a monolayer (i.e., single-layer) membrane produced from the extrudate. The extrudate can be produced from polymer and diluent as follows.

In an embodiment, the microporous membrane is produced by a process comprising: (1) combining diluent (e.g., a membrane-forming solvent) and polyolefin, (2) extruding the combined diluent and polyolefin through a die to form an extrudate; (3) optionally cooling the extrudate to form a cooled extrudate, e.g., a gel-like sheet; (4) stretching the cooled extrudate in at least one planar direction, e.g., stretching in the transverse direction (TD), the machine direction (MD), or both; and (5) removing at least a portion of the diluent from the extrudate or cooled extrudate to form a membrane.

Optionally, the process further comprises (6) removing at least a portion of any remaining volatile species from the membrane at any time after step (5).

Optionally, the process further comprises (7) subjecting the membrane to a thermal treatment (such as heat setting or annealing) at any time after step (5).

Optionally, the process further comprises stretching the membrane in at least one planar direction at any time after step (5), e.g., between steps (6) and (7). For example, the process can further comprise (8) stretching the dried membrane of step (6) in the MD from the first dry length to a second dry length larger than the first dry length by a magnification factor in the range of from about 1.1 to about 1.5 and stretching the membrane in the TD from a first dry width to a second width that is larger than the first dry width by a magnification factor in the range of from about 1.1 to about 1.3; and then (9) decreasing the second dry width to a third dry width, the third dry width being in the range of from the first dry width to about 1.1 times larger than the first dry width.

An optional hot solvent treatment step, an optional heat setting step, an optional cross-linking step with ionizing radiation, and an optional hydrophilic treatment step, etc., as described in PCT Publication No. WO2008/016174 can be conducted if desired. Neither the number nor order of the optional steps is critical.

Combining Polyolefin and Diluent

The polymer mixture as described above can be combined, e.g., by dry mixing or melt blending, and then can be combined with at least one diluent to produce a polyolefin-diluent mixture, e.g., a polymer solution. Alternatively, the polymer mixture and diluent can be combined in a single step. The resins and solvents can be added sequentially, in parallel, or in a combination thereof. Alternatively, a polymer mixture can produced by first combining at least a portion of the resins to make a polymer composition, and then combining the polymer composition with at least one membrane-forming solvent (and optionally additional portions of the resins and/or additional resins) to produce a polymer solution. Optionally, the polymer solution contains additives such as one or more of antioxidant, fine silicate powder (pore-forming material), etc. The amount of such additives is not critical, provided they are not present in amounts large enough to adversely affect the membrane's properties. Generally, the amount of such additives in aggregate does not exceed 1 wt %, based on the weight of the polymer solution.

The use of a diluent comprising liquid membrane-forming solvent can make it less difficult to conduct stretching at relatively high magnifications. The liquid solvents can be, for example, aliphatic, alicyclic or aromatic hydrocarbons such as nonane, decane, decalin, p-xylene, undecane, dodecene; liquid paraffin; mineral oil distillates having boiling points comparable to those of the above hydrocarbons; and phthalates liquid at room temperature, such as dibutyl phthalate, dioctyl phthalate, etc. The use of a non-volatile solvent such as liquid paraffin can make it easier to obtain a gel-like molding (or gel-like sheet) having a stable solvent content. In an embodiment, one or more solid solvents, which are miscible with the polymer solution or polymer composition during melt-blending but solid at room temperature, may be added to the liquid solvent. Such solid solvents can be, e.g., stearyl alcohol, ceryl alcohol, paraffin waxes, etc. Solid solvent can be used without liquid solvent, but in this case it can be more difficult to evenly stretch the gel-like sheet during step (4).

In an embodiment, the viscosity of the liquid solvent ranges from about 30 cSt to about 500 cSt, or from about 30 cSt to about 200 cSt, when measured at a temperature of 25° C. Although the choice of viscosity is not particularly critical, when the viscosity at 25° C. is less than about 30 cSt, the polyolefin solution might foam, resulting in difficulty in blending. On the other hand, when the viscosity is more than about 500 cSt, it can be more difficult to remove the solvent during step (5). The polymer solution can contain additives such as one or more antioxidant. In an embodiment, the amount of such additives does not exceed 1 wt % based on the weight of the polymer solution.

The amount of membrane-forming solvent used to produce the extrudate is not critical, and can be in the range, e.g., of from about 25 wt % to about 99 wt % based on the weight of the combined membrane-forming solvent and polymer composition.

Extruding

In an embodiment, the combined polymer composition and the diluent (a membrane-forming solvent in this case) are conducted from an extruder to a die.

The extrudate or cooled extrudate should have an appropriate thickness to produce, after the stretching steps, a final membrane having the desired thickness (generally 3 μM or more). For example, the extrudate can have a thickness in the range of about 0.1 mm to about 10 mm, or about 0.5 mm to 5 mm. Extrusion is generally conducted with the mixture of polymer composition and membrane-forming solvent in the molten state. When a sheet-forming die is used, the die lip is generally heated to an elevated temperature, e.g., in the range of 140° C. to 250° C. Suitable process conditions for accomplishing the extrusion are disclosed in PCT Publication Nos. WO 2007/132942 and WO 2008/016174. The machine direction ("MD") is defined as the direction in which the extrudate is produced from the die. The transverse direction ("TD") is defined as the direction perpendicular to both MD and the thickness direction of the extrudate. The extrudate can be produced continuously from a die, or it can be produced from the die in portions (as is the case in batch processing) for example. The definitions of TD and MD are the same in both batch and continuous processing.

Optional Extrudate Cooling

Optionally the extrudate can be exposed to a temperature in the range of 5° C. to 40° C. to form a cooled extrudate. Cooling rate is not particularly critical. For example, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Publication Nos. WO 2008/016174 and WO 2007/132942, for example.

Stretching the Extrudate

The extrudate or cooled extrudate is stretched in at least one direction. The extrudate can be stretched by, for example, a tenter method, a roll method, an inflation method or a combination thereof, as described in PCT Publication No. WO 2008/016174, for example. The stretching may be conducted monoaxially or biaxially, though the biaxial stretching is preferable. In the case of biaxial stretching, any of simultaneous biaxial stretching, sequential stretching or multi-stage stretching (for instance, a combination of the simultaneous biaxial stretching and the sequential stretching) can be used, though simultaneous biaxial stretching is preferable. When biaxial stretching is used, the amount of magnification need not be the same in each stretching direction.

The stretching magnification factor can be, for example, 2 fold or more, preferably 3 to 30 fold in the case of monoaxial stretching. In the case of biaxial stretching, the stretching magnification factor can be, for example, 3 fold or more in any direction (e.g., in the range of 3 fold to 30 fold), such as 16 fold or more, e.g., 25 fold or more, in area magnification. An example of this stretching step includes stretching from about 9 fold to about 49 fold in area magnification. Again, the amount of stretch in each direction need not be the same. The magnification factor operates multiplicatively on film size. For example, a film having an initial width (TD) of 2.0 cm that is stretched in TD to a magnification factor of 4 fold will have a final width of 8.0 cm. The machine direction ("MD") is a direction in the plane of the film (the extrudate in this instance) which is oriented approximately along the direction of travel as the film is formed, i.e., the longest axis of the film during production. The transverse direction ("TD") also lies in the plane of the film and is approximately perpendicular to both the machine direction and a third axis approximately parallel to the thickness of the film.

While not required, the stretching can be conducted while exposing the extrudate to a temperature (the stretching temperature) in the range of from about Tcd to Tm, where in this instance Tcd and Tm are the crystal dispersion temperature and melting peak of the polymer having the lowest melting peak among the polymers used to produce the extrudate (usually the low melting polypropylene). The crystal dispersion temperature is determined by measuring the temperature characteristics of dynamic viscoelasticity according to ASTM D 4065. In an embodiment where Tcd is in the range of about 90° C. to 100° C., the stretching temperature can be from 90.0° C. to 125.0° C.; e.g., from about 100° C. to 125.0° C., such as from 105° C. to 125.0° C. Optionally, the stretching temperature is ≤Tm−10.0° C.

In an embodiment, the stretched extrudate undergoes an optional thermal treatment before diluent removal. In the thermal treatment, the stretched extrudate is exposed to a temperature that is higher (warmer) than the temperature to which the extrudate is exposed during stretching. The planar dimensions of the stretched extrudate (length in MD and width in TD) can be held constant while the stretched extrudate is exposed to the higher temperature. Since the extrudate contains diluent, its length and width are referred to as the "wet" length and "wet" width. In an embodiment, the stretched extrudate is exposed to a temperature in the range of 120.0° C. to 125.0° C. for a time sufficient to thermally treat the extrudate, e.g., a time in the range of 1 second to 100 seconds while the wet length and wet width are held constant, e.g., by using tenter clips to hold the stretched extrudate along its perimeter. In other words, during the thermal treatment, there is no magnification or demagnification (i.e., no dimensional change) of the stretched extrudate in MD or TD.

In this step and in other steps such as dry orientation and heat setting where the sample (e.g., the extrudate, dried extrudate, membrane, etc.) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum for example. Other methods for exposing the sample to an elevated temperature, including conventional methods such as exposing the sample to a heated surface, infra-red heating in an oven, etc. can be used with or instead heated air.

Diluent Removal

In an embodiment, at least a portion of the diluent is removed (or displaced) from the stretched extrudate to form a dried membrane. A displacing (or "washing") solvent can be used to remove (wash away, or displace) the diluent, as described in PCT Publication No. WO 2008/016174, for example.

Drying the Membrane

In an embodiment, at least a portion of any remaining volatile species (e.g., washing solvent) is removed from the dried membrane after diluent removal. Any method capable of removing the washing solvent can be used, including conventional methods such as heat-drying, wind-drying (moving air), etc. Process conditions for removing volatile species such as washing solvent can be the same as those disclosed in PCT Publication No. WO 2008/016174, for example.

Thermal Treatment

In an embodiment, the membrane is subjected to a thermal treatment such as heat setting. During heat-setting, the membrane is, e.g., exposed to a temperature in the range of from about Tcd to about Tm, for example from 90.0° C. to 130.0° C., from about 100.0° C. to 128.0° C. or 105.0° C. to 125.0° C. In this instance Tm is the melting peak of the polymer having the lowest melting peak among the polymers used to produce the membrane, e.g., the first polyethylene.

Stretching the Membrane (Dry Orientation)

Optionally, the dried membrane of the step (6) can be stretched (called "dry stretching" since at least a portion of the diluent has been removed or displaced) in at least one direction between the step (6) and (7). A dried membrane that has been dry stretched is called an "oriented" membrane. Before dry stretching, the dried membrane has an initial size in MD (a first dry length) and an initial size in TD (a first dry width). As used herein, the term "first dry width" refers to the size of the dried membrane in the TD prior to the start of dry orientation. The term "first dry length" refers to the size of the dried membrane in the MD prior to the start of dry orientation. Tenter stretching equipment of the kind described in PCT Publication No. WO 2008/016174 can be used, for example.

The dried membrane can be stretched in MD from the first dry length to a second dry length that is larger than the first dry length by a magnification factor (the "MD dry stretching magnification factor") in the range of from about 1.1 to about 1.5. When TD dry stretching is used, the dried membrane can be stretched in TD from the first dry width to a second dry width that is larger than the first dry width by a magnification factor (the "TD dry stretching magnification factor"). Optionally, the TD dry stretching magnification factor is ≤the MD dry stretching magnification factor. The TD dry stretching magnification factor can be in the range of from about 1.1 to about 1.3. The dry stretching (also called re-stretching since the membrane-forming solvent-containing extrudate has already been stretched) can be sequential or simultaneous in MD and TD. Since TD heat shrinkage generally has a greater effect on battery properties than does MD heat shrinkage, the amount of TD magnification generally does not exceed the amount of MD magnification. When TD dry stretching is used, the dry stretching can be simultaneous in MD and TD or sequential. When the dry stretching is sequential, generally MD stretching is conducted first followed by TD stretching.

The dry stretching can be conducted while exposing the dried membrane to a temperature ≤Tm, e.g., in the range of from about Tcd−30° C. to Tm. In this instance Tm is the melting peak of the polymer having the lowest melting peak among the polymers used to produce the membrane, e.g. the first polyethylene. In an embodiment, the stretching temperature is conducted with the membrane exposed to a temperature in the range of from about 70.0° C. to about 130.0° C., for example from about 80.0° C. to about 129.0° C. In an embodiment, the MD stretching is conducted before TD stretching, and
(i) the MD stretching is conducted while the membrane is exposed to a first temperature in the range of Tcd−30° C. to about Tm−10° C., for example 70.0° C. to 129.0° C., or about 80° C. to about 125° C. and
(ii) the TD stretching is conducted while the membrane is exposed to a second temperature that is higher than the first temperature but lower than Tm, for example 70.0° C. to 129.0° C., or about 105° C. to about 125° C., or about 110° C. to about 120° C.

In an embodiment, the total MD dry stretching magnification factor is in the range of from about 1.1 to about 1.5, such as 1.2 to 1.4; the total TD dry stretching magnification factor is in the range of from about 1.1 to about 1.3, such as 1.15 to 1.25; the MD dry stretching is conducted before the TD dry stretching, the MD dry stretching is conducted while the membrane is exposed to a temperature in the range of 80.0° C. to about 120.0° C., and the TD dry stretching is conducted while the membrane is exposed to a temperature in the range of 115.0° C. to about 130.0° C., but less than Tm.

The stretching rate is preferably 3%/second or more in the stretching direction (MD or TD), and the rate can be independently selected for MD and TD stretching. The stretching rate is preferably 5%/second or more, more preferably 10%/second or more, e.g., in the range of 5%/second to 25%/second. Though not particularly critical, the upper limit of the stretching rate is preferably 50%/second to prevent rupture of the membrane.

Controlled Reduction of the Membrane's Width (Heat-Relaxing of the Membrane)

Following the dry stretching, the dried membrane is optionally subjected to a controlled reduction in width from the second dry width to a third dry width, the third dry width being in the range of from the first dry width to about 1.1 times larger than the first dry width. The width reduction generally conducted while the membrane is exposed to a temperature ≥Tcd−30° C., but no greater than Tm of the first polyethylene. For example, during width reduction the membrane can be exposed to a temperature in the range of from 70.0° C. to about 130.0° C., such as from about 115° C. to about 130.0° C., e.g., from about 120° C. to about 128° C. In an embodiment, the decreasing of the membrane's width is conducted while the membrane is exposed to a temperature that is lower than Tm of the low melting polypropylene. In an embodiment, the third dry width is in the range of from 1.0 times larger than the first dry width to about 1.1 times larger than the first dry width.

It is believed that exposing the membrane to a temperature during the controlled width reduction that is ≥the temperature to which the membrane was exposed during the TD stretching leads to greater resistance to heat shrinkage in the finished membrane, Structure, Properties, and Composition The membrane has a shutdown temperature in the range of 125.0° C. to 130.0° C., and air permeability in the range of $1.0 \times 10^2$ seconds/100 $cm^3$/20 µm to $5.0 \times 10^2$ seconds/100 $cm^3$/20 µm.

In an embodiment, the membrane's thickness is generally in the range of from about 1 µm to about 100 µm, e.g., from about 5 µm to about 30 µm. The thickness of the microporous membrane can be measured by a contact thickness meter at 1 cm longitudinal intervals over the width of 20 cm, and then averaged to yield the membrane thickness. Thickness meters such as the Litematic available from Mitsutoyo Corporation are suitable. This method is also suitable for measuring thickness variation after heat compression, as described below. Non-contact thickness measurements are also suitable, e.g., optical thickness measurement methods.

The final microporous membrane generally comprises the polymer used to produce the extrudate. A small amount of diluent or other species introduced during processing can also be present, generally in amounts less than 1 wt % based on the weight of the microporous membrane. A small amount of polymer molecular weight degradation might occur during processing, but this is acceptable. In an embodiment, molecular weight degradation during processing, if any, causes the value of MWD of the polymer in the membrane to differ from the MWD of the polymer used to produce the membrane by no more than, e.g., about 10%, or no more than about 1%, or no more than about 0.1%.

While the extrudate and the microporous membrane can contain other materials such as inorganic species (e.g., species containing silicon and/or aluminum atoms), and/or heat-resistant polymers such as those described in PCT Publication Nos. WO 2007/132942 and WO 2008/016174, these are not required. In an embodiment, the extrudate and membrane are substantially free of such materials. Substantially free in this context means the amount of such materials in the microporous membrane is less than 1.0 wt %, based on the total weight of the polymer used to produce the extrudate.

The microporous membrane can be a monolayer membrane. In an embodiment, the microporous membrane further comprises a second membrane. The second membrane can be, e.g., a microporous layer.

Optionally, the microporous membrane has one or more of the following properties.

(a) Normalized Air Permeability ≤$7.5 \times 10^2$ sec/100 $cm^3$/20 µm

In an embodiment, the membrane's normalized air permeability (Gurley value, expressed as the air permeability of an equivalent membrane having a thickness of 20 µm) is ≤$7.5 \times 10^2$ seconds/100 $cm^3$/20 µm, e.g., in the range of about 50.0 seconds/100 $cm^3$/20 µm to about $7.5 \times 10^2$ seconds/100 $cm^3$/20 µm. Since the air permeability value is normalized to the value for an equivalent membrane having a film thickness of 20 µm, the membrane's air permeability value is expressed in units of "seconds/100 $cm^3$/20 µm". In an embodiment, the normalized air permeability is in the range of 100 seconds/100 $cm^3$/20 µm to about 450 seconds/100 $cm^3$/20 µm. Normalized air permeability is measured according to JIS P8117, and the results are normalized to permeability value of an equivalent membrane having a thickness of 20 µm using the equation $A = 20 \, \mu m * (X)/T_1$, where X is the measured air permeability of a membrane having an actual thickness $T_1$ and A is the normalized air permeability of an equivalent membrane having a thickness of 20 µm.

(b) Porosity in the Range of from about 25% to about 80%

In an embodiment, the membrane has a porosity ≥25%, e.g., in the range of about 25% to about 80%, or 30% to 60%. The membrane's porosity is measured conventionally by comparing the membrane's actual weight to the weight of an equivalent non-porous membrane of the same composition (equivalent in the sense of having the same length, width, and thickness). Porosity is then determined using the formula: Porosity %=100×(w2−w1)/w2, wherein "w1" is the actual weight of the microporous membrane and "w2" is the weight of the equivalent non-porous membrane having the same size and thickness.

(c) Shutdown Temperature 130.5° C.

The microporous membrane's shutdown temperature is measured by the method disclosed in PCT Publication No. WO2007/052663, which is incorporated by reference herein in its entirety. According to this method, the microporous membrane is exposed to an increasing temperature (5° C./minute beginning at 30° C.) while measuring the membrane's air permeability. The microporous membrane's shutdown temperature is defined as the temperature at which the microporous membrane's air permeability (Gurley Value) first exceeds 100,000 seconds/100 cm³. The microporous membrane's air permeability is measured according to JIS P8117 using an air permeability meter (EGO-1T available from Asahi Seiko Co., Ltd.).

In an embodiment, the membrane has a shutdown temperature in the range of 120.0° C. to 130.0° C., e.g., in the range of from 124.0° C. to 129.0° C.

(e) Melt Down Temperature ≥140.0° C.

(i) Melt Down Temperature (Thermal Gurley Method)

Melt down temperature (Thermal Gurley method) is measured by heating at a rate of 5° C./minute following measure of shutdown temperature. Melt down temperature is defined as the temperature at which air permeability of the microporous membrane is less than 100,000 sec/100 cm³ again after air permeability of the microporous membrane first exceeds 100,000 sec/100 cm³ Using the first polyethylene to produce of the microporous membrane is not believed to significantly affect the membrane's meltdown temperature.

(ii) Melt Down Temperature (Penetration Method)

Melt down temperature (Penetration method) is measured by the following procedure. A microporous membrane of 50 mm×50 mm is sandwiched by metallic block frame having a circular opening of 12 mm in diameter, and a tungsten carbide ball of 10 mm in diameter is placed on the microporous membrane in the circular opening. The microporous membrane is located to having a plane horizontally. The metallic block frame is heated by heater. Starting at 30° C., the temperature inside the tube is elevated at a rate of 5° C./minute. The melt down temperature (Penetration method) is defined as the temperature at which the ball breaks through the membrane.

(f) Pin Puncture Strength

Pin puncture strength is measured by the following procedure. The microporous membrane having a porosity of Pro and a thickness of $T_1$ is pricked with a needle of 1 mm in diameter (radius R of curvature: 0.5 mm) at a speed of 2 mm/second. The maximum load is measured and defined as pin puncture strength $L_{MAX}$. $L_{MAX}$ is converted to pin puncture strength $L_{20}$ at a thickness of 20 µm by the equation of $L_{20}=(L_{MAX}\times20)/T_1$. $L_{MAX}$ is converted to pin puncture strength $L_{50\%}$ at a porosity of 50% by the equation of $L_{50\%}=L_{20}/(1-Pro/100)\times0.5$.

(g) Heat Shrinkage

Heat shrinkage is measured by the following procedure. A test piece is cut out of the microporous membrane and measure the size of the test piece in both the machine direction (MD) and transverse direction (TD). Then the test piece is exposed at a temperature of 105° C. for 8 hours and is measured the size of the membrane. The heat shrinkage ratio in either the machine or transverse directions can be obtained by following equation.

(Length before heating−Length after heating)/Length before heating×100

Battery Separator and Battery

The microporous membrane of this invention has well-balanced shutdown temperature and air permeability, and is permeable to liquid (aqueous and non-aqueous) at atmospheric pressure. Thus, the microporous membrane can be used as a battery separator, filtration membrane, and so on. The microporous membrane is particularly useful as a secondary battery separator, such as in a nickel-hydrogen battery, nickel-cadmium battery, nickel-zinc battery, silver-zinc battery, lithium-ion battery, lithium-ion polymer battery separator. In an embodiment, the membrane is used as battery separator film in lithium-ion secondary batteries.

Such batteries are described in PCT Publication No. WO 2008/016174 which is incorporated by reference herein in its entirety.

This invention will be described in more detail with reference to examples below without intention of restricting the scope of this invention.

EXAMPLES

Example 1

Preparation of the Low Melting Polypropylene (PP1)

The low melting polypropylene is prepared as generally described in U.S. application Ser. No. 11/529,839, incorporated herein by reference in its entirety. The catalyst is rac-dimethylsilylbis(indenyl)hafnium dimethyl (obtained from Albemarle) pre-activated with trimethylammonium tetrakis(pentafluorophenyl)borate (obtained from Albemarle). The propylene flow rate is 16.0 g/min., the hexene flow rate is 1.0 g/min., and the hexane flow rate is 80.0 cc/min. The resulting polypropylene has a MFR of 1,000, a Mn of about 30,000 g/mol and a MWD of 2.0 and the details are shown in Table 1.

The heat of fusion ΔHm of the PP was measured according to JIS K7122 as follows: A PP sample was heat-treated at 230° C. for 10 minutes in a nitrogen atmosphere in a sample holder of a differential scanning calorimeter (Pyris Diamond DSC available from Perkin Elmer, Inc.), cooled to 40° C. at a speed of 10° C./minute, kept at 30° C. for 2 minutes, and heated to 230° C. at a speed of 10° C./minute. The amount of heat was calculated from area Si encircled by main peak on a DSC curve (melting curve) obtained by the temperature-elevating process and base line. The amount of heat (unit: J) was divided by the weight (unit: g) of the sample to determine the heat of fusion ΔHm (unit: J/g).

Preparation of the Polyolefin Solution

A polymer composition (P1) is prepared by dry-blending (a) 16.4 wt % of PP1 having a Tm of 124.4° C., (b) 65.6 wt % of a SH800 polyethylene resin (HDPE, available from Asahi Kasei Chemicals Corp.) having a Mn of $5.6 \times 10^5$ and a MWD of 4.05, and (c) 18.0 wt % of 240M polyethylene resin (UHMWPE, available from Mitsui Petrochemical Industries, Ltd.) having a Mn of $2.0 \times 10^6$ and a MWD of 5.1. BHT was added to the polymer composition as an antioxidant to provide a BTC concentration of 0.12 wt %.

25.0 wt % of the resultant first polymer composition is charged into an extruder and 75 wt % of liquid paraffin (50 cst at 40° C.) is supplied to the extruder to produce a first polymer solution. The weight percents are based on the weight of the first polymer solution. Melt-blending is conducted at 210° C. for 5 minutes at 200 rpm.

The polymer solution was extruded through a die to produce an extrudate of the first polymer solution. The extrudate is cooled while passing through cooling rollers controlled at 20° C., producing an extrudate in the form of a gel-like sheet. The gel-like sheet is biaxially stretched (simultaneously) in MD and TD at rate of 1.0 meter/minute while exposed to a temperature of 115° C. (the "biaxial stretching temperature") to a magnification of 5-fold in each of MD and TD by a tenter-stretching machine. The stretched gel-like sheet is fixed to an aluminum frame of 20 cm×20 cm, immersed in a bath of methylene chloride controlled at 25° C. for three minutes to remove the liquid paraffin, and dried by air flow at room temperature to produce a dried membrane. The membrane, which remains fixed to the batch-stretching machine, is then heat-set while exposed to a temperature of 115.0° C. (the "heat set temperature") for 10 minutes to produce the final microporous membrane.

Example 2

Example 1 is substantially repeated except that the amount of low melting polypropylene is reduced to 8.2 wt % and the amount of SH800 polyethylene is increased to 73.8 wt %.

Example 3

The low melting polypropylene PP2 is prepared by a similar preparing method of the low melting polypropylene PP1. Properties of the low melting polypropylene PP2 shows in tablet. Example 1 is substantially repeated except that low melting polypropylene PP2 is used as low melting polypropylene, the amount of low melting polypropylene PP2 is reduced to 8.2 wt % and the amount of SH800 polyethylene is increased to 73.8 wt %.

Comparative Examples 1-5

Example 1 is substantially repeated except that the amount of low melting polypropylene is replaced by the different low melting polypropylene, polyethylenes, particularly PE1-PE3, PP3 and PP4 described in Table 1 and 2.

Film properties for Examples and Comparative Examples are shown in Table 1

TABLE 1

|  | MFR | Tm (° C.) | Te − Tm (° C.) | Mn (g/mol) | MWD | ΔHm (J/g) | Density (g/cm³) |
|---|---|---|---|---|---|---|---|
| PP1 | 1000 | 124.4 | 3.0 | 28100 | 2.0 | 71.9 | 0.89 |
| PP2 | 250 | 125.3 | 3.2 | 40500 | 2.2 | 73.3 | 0.9 |
| PP3 | 150 | 124.1 | 3.7 | 50330 | 2.1 | 72.8 | 0.89 |
| PP4 | 220 | 127.5 | 12.3 | 17600 | 5.3 | 60.3 | 0.9 |

TABLE 2

|  | Melting peak Tm (° C.) | ΔH (J/g) | Mn (g/mol) | MWD |
|---|---|---|---|---|
| PE1 | 124 | — | 34000 | 3.96 |
| PE2 | 125.8 | 275 | 15000 | 3.04 |
| PE3 | 123.5 | 162 | 48000 | 2.53 |

TABLE 3

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Low Tm Component | PP1 | PP1 | PP2 | PE1 | PE2 | PE3 | PP3 | PP4 |
| Tm (° C.) | 124.4 | 124.4 | 125.3 | 124.1 | 125.8 | 123.5 | 124.1 | 127.5 |
| ΔH (J/g) | 71.9 | 71.9 | 73.3 | — | 275 | 162 | 72.8 | 60.3 |
| Mn (g/mol) | 28100 | 28100 | 40500 | 34000 | 15000 | 48000 | 50000 | 17000 |
| MWO | 2 | 2 | 2.2 | 3.96 | 3.04 | 2.53 | 2.1 | 5.3 |
| MFR | 1000 | 1000 | 2.50 | — | — | — | 150 | 220 |
| Te − Tm | 3.0 | 3.0 | 3.2 | — | — | — | 3.7 | 12.3 |
| UHMWPE/HDPE/low Tm component (wt %) | 18/65.6/16.4 | 18/73.8/8.2 | 18/73.8/8.2 | 18/65.6/16.4 | 18/65.6/16.4 | 18/65.6/16.4 | 18/73.8/8.2 | 18/73.8/8.2 |
| Thickness (μm) | 15 | 16.6 | 18.1 | 13.4 | 22.9 | 25.9 | 17.3 | 16.5 |
| Porosity (%) | 45.1 | 42.3 | 43.1 | 31.2 | 49.8 | 41.5 | 45.4 | 32.1 |
| Gurley (sec/20 μm) | 702 | 376 | 331 | 1649 | 250 | 773 | 289 | 1164 |
| Puncture Strength L20@20μ (gf/20 μm) | 164 | 254 | 265 | 286 | 178 | 148 | 208 | 497 |
| Puncture Strength L50% @20μ, 50% (gl/20 μm) | 148 | 219 | 233 | 207 | 176 | 135 | 191 | 366 |
| SOT (° C.) (Thermal Gurley method) | 123 | 127.5 | 128.1 | 123 | 127 | 126 | 127.7 | 130 |
| MOT (° C.) (Thermal Gurley method) | 144 | 146.2 | 146.0 | 144 | 146 | 144 | 146.4 | 147.2 |
| MOT (° C.) (Penetration method) | 150 | 150.8 | 150.5 | — | 152 | 150 | 150.4 | 150.1 |
| Gurley (sec) | 509 | 310 | 300 | 109.5 | 280 | 1019 | 250 | 960 |
| Puncture Strength Lmax (gf) | 122 | 210 | 240 | 191 | 202 | 204 | 180 | 410 |
| Heat Shrinkage @105° C., 8 hrs MO/TO (%) | 4.4/4.8 | 5.4/5.8 | 5.1/5.5 | 4.8/4.9 | 8.0/7.7 | 2.9/1.8 | 4.8/5.7 | 6.3/6.0 |
| Electrochemical stability | good | good | good | poor | poor | poor | fair | fair |

These results show that the inventors have found a way to make polypropylene, which is usually high melting, perform a shutdown function in the microporous membrane at the same or similar temperature as polyethylene, without undesirably affecting other important membrane properties. It is also believed that the incorporation of the low melting polypropylene will provide a way to improve oxidation resistance. Thus, the low melting polypropylene provides both low shutdown temperature and oxidation resistance.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

INDUSTRIAL APPLICABILITY

The microporous membrane of this invention can be used as a battery separator film of, e.g., a lithium-ion secondary battery separator etc. Such membrane can be preferably used for a battery as a power source in, e.g., an electric vehicle, hybrid electric vehicle, power tool, computer, mobile phone, consumer electronics, etc.

What is claimed is:

1. A microporous membrane comprising a low melting polypropylene, wherein the low melting polypropylene is (i) a polypropylene homopolymer having a number average molecular weight (Mn) of $1.0 \times 10^4$ to $5.0 \times 10^4$, a molecular weight distribution (MWD, defined Mw/Mn, where Mn is the number average molecular weight and Mw is weight average molecular weight) of 1.5 to 5.0, a melt flow rate (MFR)$\geq 2.0 \times 10^2$, a peak melting point (Tm) of 85.0° C. to 130.0° C., and a difference between melting end point (Te) and Tm (Te-Tm)$\leq 10°$ C. and/or (ii) a propylene copolymer of propylene and $\leq 10.0$ mol. % of one or more α-olefin comonomers, having a Mn of $1.0 \times 10^4$ to $5.0 \times 10^4$, a MWD of 1.8 to 3.5, a MFR$\geq 2.0 \times 10^2$, a Tm of 85.0° C. to 130.0° C., and a Te-Tm$\leq 10°$ C.

2. The microporous membrane of claim 1, wherein the membrane has a normalized air permeability $\leq 7.5 \times 10^2$ seconds/100 cm$^3$/20 µm and a shutdown temperature $\leq 130.5°$ C.

3. The microporous membrane according to claim 1, wherein the membrane comprises from 5.0 to 30.0 wt % of the low melting polypropylene, based on the weight of the membrane.

4. The microporous membrane according to claim 1, wherein the membrane further optionally comprises one or more of a first polyethylene having a Tm$\geq 131.0°$ C. and a Mn of $1.0 \times 10^5$ to $9.0 \times 10^5$, and a second polyethylene having a Mn$> 1.0 \times 10^6$.

5. The microporous membrane according to claim 1, wherein the low melting polypropylene is a propylene copolymer of propylene and $\leq 3.0$ mol. % to 15.0 mol. % comonomer selected from a group comprising ethylene and $C_4$-$C_{12}$ α-olefins.

6. The microporous membrane according to claim 5, where in the $C_4$-$C_{12}$ α-olefin is hexene and/or octene.

7. The microporous membrane according to claim 1, wherein the Tm of the propylene copolymer is 100.0° C. to 126.0° C., and the Te-Tm of the propylene copolymer is 2.0° C. to 4.0° C.

8. The microporous membrane according to claim 1, wherein the membrane further comprises one or more of a first polyethylene having a Tm$\geq 131.0°$ C. and a Mn of $1.0 \times 10^5$ to $9.0 \times 10^5$, and a second polyethylene having a Mn$> 1.0 \times 10^6$, wherein the amount of combined first and second polyethylene in the membrane is in the range of 70 wt. % to 95 wt. %, based on the weight of the membrane.

* * * * *